(12) United States Patent
Rolland et al.

(10) Patent No.: US 6,211,291 B1
(45) Date of Patent: Apr. 3, 2001

(54) POLYOLEFIN COMPOSITIONS

(75) Inventors: Loic Pierre Rolland; Melanie Beatrice Boisson, both of Divonne-les-Bains (FR)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/462,227

(22) PCT Filed: Jun. 30, 1998

(86) PCT No.: PCT/US98/13611
  § 371 Date: Jun. 28, 2000
  § 102(e) Date: Jun. 28, 2000

(87) PCT Pub. No.: WO99/01488
  PCT Pub. Date: Jan. 14, 1999

(30) Foreign Application Priority Data

Jul. 1, 1997 (EP) ................................................. 97201992

(51) Int. Cl.[7] ................................................. C08G 63/48
(52) U.S. Cl. ................................................. 525/74; 525/208
(58) Field of Search ........................................ 525/74, 208

(56) References Cited

U.S. PATENT DOCUMENTS

| | | | |
|---|---|---|---|
| 4,157,428 | 6/1979 | Hammer | 521/134 |
| 4,758,629 | 7/1988 | Deyrup et al. | 525/194 |
| 5,159,006 | 10/1992 | Breant | 524/436 |
| 5,206,294 | * 4/1993 | Dawson | 525/196 |
| 5,395,881 | 3/1995 | Spelthann | 525/63 |
| 5,434,217 | 7/1995 | Spelthann | 525/63 |

FOREIGN PATENT DOCUMENTS

| | | | |
|---|---|---|---|
| 0 703 271 A1 | 3/1996 | (EP) | C08L/23/08 |
| WO 89/06256 | 7/1989 | (WO) | C08K/3/22 |
| WO 93/19118 | 9/1993 | (WO) . | |

OTHER PUBLICATIONS

PCT International Search Report for International application No. PCT/US98/13611 dated Oct. 22, 1998.
European Search Report for Application No. 98933001.4–1220–US9813611 dated Aug. 2, 2000.

* cited by examiner

Primary Examiner—Paul R. Michl
(74) Attorney, Agent, or Firm—Patricia L. Kelly

(57) ABSTRACT

Nonhalogen-Containing Thermoplastic Polyolefin blends are provided which are either heat resistant and are particularly useful in wire and cable coatings, extruded profiles, sheet form or injection molded part or have an elastomeric behavior and are particularly useful in injection molded part. These blends comprise preferably (1) ethylene n-butyl acrylate glycidyl methacrylate (EnBAGMA) terpolymer, (2) an ethylene propylene rubber (EPDM) grafted with maleic anhydride, (3) a polypropylene homopolymer for heat resistance or a very low density polyethylene for elastomeric behavior or a linear low density polyethylene (LLDPE) or a low density polyethylene or a high density polyethylene or an ethylene-polypropylene copolymer.

4 Claims, No Drawings

POLYOLEFIN COMPOSITIONS

BACKGROUND OF THE INVENTION

1. Field of Invention

This invention relates to polyolefin compositions and more particularly to such compositions which have good heat performance or elastomeric characteristics, and to shaped articles made from them.

2. Background Discussion

Polyvinyl chloride (PVC) compositions have been on the market for many years and are commonly used in a large variety of applications. With the trend toward a chlorine-free environment, there is in some market segments such as construction, automotive and wires and cables industries a need for an alternative to PVC. Crosslinked polyolefin compounds or blends of fluoropolymers and PVC have been proposed, though both solution tend to be expensive.

WO 93/19118 and WO 89/06256 disclose PVC-free compositions that are suitable for use as coatings for electrical cables. These compositions contain several components that are similar to those described, but lack, i.a, the terpolymer described in the present application.

EP 0 703 271 A1 discloses flexible, halogen-free thermoplastic polyolefin compositions, including certain which are based upon ethylene vinyl acetate, ethylene vinyl acetate carbon monoxide and very low density polyethylene. While these compositions are useful in many applications, they have been found to soften or melt unacceptably under certain high temperature applications.

SUMMARY OF THE INVENTION

According to the present invention there is provided a polyolefin composition which has good heat performance or elastomeric characteristics, is free from halogen-containing and comprises a blend of:

(1) ethylene n-butyl acrylate glycidyl methacrylate terpolymer containing 30–90% by weight ethylene, 10–70% by weight n-butylacrylate and 0.5–30% by weight glycidyl acrylate or methacrylate, (2) a polyolefin or rubber selected from the group consisting of (a) ethylene propylene diene methylene rubber (EPDM), (b) a linear low density polyethylene, (c) an ethylene-propylene copolymer, and (d) a very low density polyethylene, or a blend thereof; each of which is grafted with 0.05–3% by weight of a carboxylic acid or any anhydride thereof, and (3) a polyolefin selected from the group consisting of (a) polypropylene homopolymer, (b) very low density polyethylene (c) linear low density polyethylene (d) low density polyethylene (e) high density polyethylene and (f) ethylene-polypropylene copolymer.

Common additives which may be included in the composition of the present invention include brominated fillers, aluminium trihydrate or magnesium hydroxide for flame retardancy, antioxidants, titanium dioxide (for UV resistance and to give a white color to the product), processing aids like zinc stearate and UV stabilizers.

DETAILED DESCRIPTION OF THE INVENTION

The present invention relates to heat resistant non-halogen containing thermoplastic polyolefin blends which are useful in wire and cable coatings, extruded profiles, sheet form or injection molded parts, as well as to elastomeric thermoplastic polyolefin blends which are useful in injection molded parts. These blends generally are formed by combining an ethylene n-butyl acrylate glycidyl methacrylate (EnBAGMA) terpolymer, polymer or rubber grafted with maleic anhydride and a polyolefin all of which are chlorine free.

Polymer blends according to the present invention can be formed in wire and cable coatings, extruded profiles, sheet form or injection molded parts which have many properties comparable to polyvinyl chloride (PVC) containing blends, but with better resistance to heat than polypropylene.

Unless otherwise stated, percentage weight ranges for each of the components in the composition of the present invention are calculated exclusive of any additives which may be present.

The EnBAGMA terpolymer (component (1)) useful in this invention preferably contains 30–90% by weight ethylene, 10–70% by weight nbutylacrylate and 0.5–30% by weight glycidyl acrylate or methacrylate, more preferably 50–80% by weight ethylene, 20–35% by weight nbutylacrylate and 0.5–10% by weight glycidyl methacrylate or acrylate. In general, these EnBAGMA's have a melt flow index (MFI) in the range of 1–50 g/10 min., preferably in the range of 5–20 g/10 min. as determined by ASTM D-1238 (measured at 2.16 kg and 190° C.) and are well-known in the art.

Component (1) preferably comprises 1–40% by weight of the composition of the present invention, more preferably 5–25% by weight, still more preferably 10–20% by weight.

The grafted polyolefin or rubber (component (2)) useful in this invention is preferably EPDM grafted with 0.05–3% by weight of maleic anhydride. In general, these EPDM's have a melt flow index (MFI) in the range of 0.05–100 g/10 min., preferably less than 20 g/10 min. as determined by ASTM D-1238 (measured at 2.16 kg and 190° C.) and are well-known in the art.

Component (2) preferably comprises 5–60% by weight of the composition of the present invention, more preferably 10–40% by weight, still more preferably 20–30% by weight.

The polyolefin (component (3)) will be chosen according to whether heat performance or elastomeric properties are more important for the end use of the composition, as will be known to one skilled in the art. In general, polypropylene homopolymer (PP) is preferred where heat performance is most important, and very low density polyethylene (VLDPE) is preferred where elastomeric characteristics are most important. Linear low density polyethylene (LLDPE), high density polyethylene (HDPE), low density polyethylene (LDPE) and ethylene-propylene copolymer (E-PP) will be used for end uses requiring heat performance or elastomeric characteristics that are not extreme.

The terms of VLDPE and LLDPE includes copolymers of ethylene and other alpha-olefins such as 1-butene, 1-hexene, and 1-octene. The processes for producing VLDPE, LLDPE, HDPE, LDPE, PP and E-PP are well known in the art and commercial grades of these polyolefins are available.

Component (3) preferably comprises 20–90% by weight of the composition of the present invention, more preferably 40–70% by weight, still more preferably 50–60% by weight.

In addition to its polymer components, the composition of the present invention can be blended with maleic anhydride grafted polyolefins as compatibilizers and/or with common additives such as reinforcing and non-reinforcing fillers, flame retardant fillers such as brominated fillers, magnesium hydroxide, aluminium trihydrate, antioxidants, UV stabilizers, lubricants (e.g., oleamide), antiblocking agents, antistatic agents, waxes, coupling agents for fillers, pigments, titanium dioxide, talc and other processing aids (e.g., zinc stearate ) known in the polymer compounding art. The pigments and other additives may comprise up to about 70 weight percent of the total composition based on polymer components plus additives (the polymer components being present in amounts with respect to each other in the proportions previously specified); preferably pigments and fillers comprise above about 0 to about 70 weight percent of the total composition.

The blends of the invention can be prepared by mixing the polymeric ingredients and optional additives by use of conventional masticating equipment, for example, a rubber mill, Brabender Mixer, Banbury Mixer, Buss-ko kneader, Farrel continuous mixer or twin screw continuous mixer. Mixing times should be sufficient to obtain homogeneous blends and reaction between the glycidyl methacrylate groups of EnBAGMA and the maleic anhydride of the grafted polymer (component 2). Satisfactory mixing times depend upon the type of mixing equipment (shear intensity). Typically, mixing times of about 5 minutes are satisfactory on a batch mixer (Banbury ) while 1.5–2 minutes are satisfactory on a continuous mixer (Brabender, Buss ko-kneader, Farrel or twin screws). If the polymer blend is obviously non-homogeneous, additional mixing is required.

The invention can be further understood by the following examples in which parts and percentages are by weight or in parts per hundred rubber (phr) and temperatures are in degrees Celsius.

EXAMPLES 1–4

Legend
MFI=melt flow index
EnBAGMA=ethylene n-butylacrylate glycidyl methacrylate
EPDM=ethylene propylene rubber
MAH=maleic anhydride
VLDPE=very low density polyethylene
LLDPE=linear low density polyethylene
PP=polypropylene homopolymer
Procedure A blend is prepared by melt-compounding the following components in the proportions set forth in Table 1 below.

EnBAGMA (66.75% ethylene, 28% n-butylacrylate and 5.25% glycidyl methacrylate) having a MFI (190°/2.16 kg) of 12

MAH grafted EPDM (2% MAH) having a MFI (190°/2.16 kg) of 2.0

PP having a MFI (230°/2.16 kg) of 21

MAH grafted PP (0.55% MAH) having a MFI (190°/2.16 kg) of 250

MAH grafted LLDPE (0.85% MAH) having a MFI (190°/2.16 kg) of 40

VLDPE having a density of 0.870 and a MFI (190°/2.16 kg) of 30

Brominated flame retardant filler (SAYTEX 120)

Antimony trioxide flame retardant filler (FSPO 405) available from Chemetron antioxidant-phenolic type available under the name IRGANOX 1010 from Ciba Zinc stearate Melt compounding is carried out on a two roll mill with batches from 100 grams at 170–190° C. for ca. 5 minutes. The milled product is formed into a testing plaque in a hydraulic press at 170–190° C. for 5 minutes. Afterwards stress-strain (tensile strength-tensile elongation) testing (ASTM D-638) Heat Deformation at 90 and 160° C. (a 30 gr weight is hanged to a plate sample having a thickness of 0.5 mm, a length of 10 cm and a width of 10 mm) and permanent set test in tension (ASTM D412) are carried out. Results are shown in Table 1.

TABLE 1

| Example numbers | 1 | 2 | Test method |
|---|---|---|---|
| EnBAGMA | 14 | 10 | |
| MAH grafted EPDM | 17 | 25 | |
| PP | 45.6 | — | |
| VLDPE | — | 49.8 | |
| MAH grafted PP | 9.0 | — | |
| MAH grafted LLDPE | — | 15 | |
| Brominated filler | 10 | — | |
| Antimony trioxide | 4 | — | |
| Antioxidant | 0.4 | 0.2 | |
| Tensile strength | 18 MPa | 11 MPa | ASTM D 638 |
| Tensile elongation | 250% | 590% | ASTM D 638 |
| Heat def. at 90° C. | 0% | 0% | (defined in text) |
| Heat def. at 160° C. | 0% | molten | (defined in text) |
| Permanent set in tension | — | 20% | ASTM D 412 |
| Shore A hardness | — | 80 | ASTM 2240 |
| Specific gravity | — | 1.05 | ASTM 792 |
| Compression set at 23° C. | — | 26% | ASTM D 395–89 |
| Compression set at 100° C. | — | 71% | ASTM D 395–85 |
| Brittleness temperature | — | −80° C. | ASTM D 1043 |
| Tension set at 23° C. | — | 22% | ASTMD 412 |

One can see that the formulation containing PP shows no deformation at 160° C. and therefore has a particularly good resistance to heat deformation which is a major benefit for automotive primary wires. On the other hand, the formulation containing VLDPE shows a relatively high permanent set value which means good elastomeric behavior which is of interest for injection molded parts.

What is claimed is:

1. A flexible, halogen-free polymer composition comprising a blend of (1) ethylene n-butyl acrylate glycidyl methacrylate terpolymer containing 30–90% by weight ethylene, 10–70% by weight n-butylacrylate and 0.5–30% by weight glycidyl acrylate or methacrylate, (2) a polyolefin or rubber selected from the group consisting of (a) ethylene propylene diene methylene rubber (EPDM), (b) a linear low density polyethylene, (c) an ethylene-propylene copolymer, and (d) a very low density polyethylene, or a blend thereof; each of which is grafted with 0.05–3% by weight of a carboxylic acid or any anhydride thereof, and (3) a polyolefin selected from the group consisting of (a) polypropylene homopolymer, (b) very low density polyethylene (c) linear low density polyethylene (d) low density polyethylene (e) high density polyethylene and (f) ethylene-polypropylene copolymer.

2. A blend according to claim 1 wherein component (1) comprises 1–40% by weight of the blend, component (2) comprises 5–60% by weight of the blend, and component (3) comprises 20–90% by weight of the blend.

3. A blend according to claim 1 wherein component (1) comprises 5–25% by weight of the blend, component (2) comprises 10–40% by weight of the blend and component (3) comprises 40–70% by weight of the blend.

4. A shaped article formed from a blend according to claim 1.

* * * * *